United States Patent
Sharma et al.

(10) Patent No.: US 10,692,385 B2
(45) Date of Patent: Jun. 23, 2020

(54) DISTANCE AND COMMUNICATION COSTS BASED AERIAL PATH PLANNING

(71) Applicant: Tata Consultancy Services Limited, Mumbai (IN)

(72) Inventors: Hrishikesh Sharma, Bengaluru (IN); Tom Kollamparambil Sebastian, Bengaluru (IN); Balamuralidhar Purushothaman, Bengaluru (IN)

(73) Assignee: Tata Consultancy Services Limited, Mumbai (IN)

( * ) Notice: Subject to any disclaimer, the term of this patent is extended or adjusted under 35 U.S.C. 154(b) by 347 days.

(21) Appl. No.: 15/912,032

(22) Filed: Mar. 5, 2018

(65) Prior Publication Data

US 2018/0268720 A1 Sep. 20, 2018

(30) Foreign Application Priority Data

Mar. 14, 2017 (IN) .............................. 201721008784

(51) Int. Cl.
  *G05D 1/00* (2006.01)
  *G08G 5/00* (2006.01)
  *G05D 1/10* (2006.01)

(52) U.S. Cl.
  CPC ........... *G08G 5/0034* (2013.01); *G05D 1/101* (2013.01); *G08G 5/006* (2013.01); *G08G 5/0069* (2013.01); *G08G 5/0078* (2013.01); *G08G 5/0086* (2013.01); *B64C 2201/123* (2013.01); *B64C 2201/127* (2013.01)

(58) Field of Classification Search
  USPC ............ 701/3–18; 244/75.1, 76 R, 175–197
  See application file for complete search history.

(56) References Cited

U.S. PATENT DOCUMENTS

| | | | | |
|---|---|---|---|---|
| 7,647,211 B2* | 1/2010 | Drumheller | ............. | G06F 30/18 703/1 |
| 7,668,700 B2* | 2/2010 | Erignac | .................. | G06F 30/20 703/1 |
| 8,010,242 B1* | 8/2011 | Ginsberg | ............. | G08G 5/0034 701/3 |

(Continued)

OTHER PUBLICATIONS

Mozaffari, M. et al., "Mobile Internet of Things: Can UAVs Provide an Energy-Efficient Mobile Architecture", Global Communications Conference (BLOBECOM), IEEE, Dec. 4-8, 2016, 6 pages.

*Primary Examiner* — Jonathan L Sample
(74) *Attorney, Agent, or Firm* — Finnegan, Henderson, Farabow, Garrett & Dunner LLP

(57) ABSTRACT

The systems and methods of the present disclosure provide a path panning algorithm for fixed-wing aerial vehicles that may be employed, particularly for monitoring of long linear infrastructures. The applicants' earlier patent applications address turn angle constraints for fixed wing aerial and maintaining transmission continuity in presence of coverage holes by imposing a plurality of constraints along with storage constraints. The present disclosure addresses a technical challenge of simultaneously meeting multiple objectives; particularly distance cost and communication cost while satisfying the plurality of constraints that enable pruning of feasible paths in a 3D Euclidean navigation space to obtain a set of optimal paths for surveillance of a target under consideration.

11 Claims, 4 Drawing Sheets

(56) References Cited

U.S. PATENT DOCUMENTS

| | | | | |
|---|---|---|---|---|
| 8,453,081 | B2* | 5/2013 | Cases | G06F 30/36 |
| | | | | 716/106 |
| 8,718,915 | B1* | 5/2014 | Turcios | G01C 23/005 |
| | | | | 342/176 |
| 2008/0215204 | A1* | 9/2008 | Roy | H04B 7/18504 |
| | | | | 701/28 |
| 2011/0246002 | A1* | 10/2011 | Shavit | G08G 5/0026 |
| | | | | 701/14 |
| 2012/0191332 | A1* | 7/2012 | Sawhill | G08G 5/0013 |
| | | | | 701/120 |
| 2013/0124089 | A1* | 5/2013 | Herman | G01C 21/20 |
| | | | | 701/528 |
| 2013/0317733 | A1* | 11/2013 | del Pozo de Poza | |
| | | | | G06Q 10/047 |
| | | | | 701/301 |
| 2014/0018979 | A1* | 1/2014 | Goossen | G08G 5/0034 |
| | | | | 701/3 |
| 2014/0032106 | A1* | 1/2014 | Ginsberg | G01C 21/00 |
| | | | | 701/528 |
| 2015/0336667 | A1* | 11/2015 | Srivastava | B64C 39/024 |
| | | | | 701/2 |
| 2016/0210863 | A1* | 7/2016 | Kohn-Rich | G05D 1/0646 |
| 2016/0275801 | A1* | 9/2016 | Kopardekar | G08G 5/0043 |
| 2017/0090482 | A1* | 3/2017 | Zammit-Mangion | |
| | | | | G05D 1/101 |
| 2017/0132942 | A1* | 5/2017 | Mere | G08G 5/0047 |
| 2017/0227955 | A1* | 8/2017 | Krupansky | G01C 21/20 |
| 2017/0235316 | A1* | 8/2017 | Shattil | G05D 1/104 |
| | | | | 701/3 |
| 2018/0247544 | A1* | 8/2018 | Mustafic | G08G 5/0069 |

\* cited by examiner

DISTANCE AND COMMUNICATION COSTS BASED AERIAL PATH PLANNING

PRIORITY CLAIM

This U.S. patent application claims priority under 35 U.S.C. § 119 to: India Application No. 201721008784, filed on Mar. 14, 2017. The entire contents of the aforementioned application are incorporated herein by reference.

TECHNICAL FIELD

The embodiments herein generally relate to aerial path planning, and more particularly to systems and methods for aerial path planning based simultaneously on distance cost and communication cost.

BACKGROUND

Usage of aerial vehicles such as unmanned aerial vehicles (UAVs) for maintenance inspections of critical utility infrastructures, is rapidly emerging as a popular option. Installations for critical utility infrastructures generally have a characteristic of being long and linear and are mostly vast in terms of size and length probably running into hundreds of kilometers. Maintenance, both preventive and breakdown, is typically a costly legal responsibility towards public safety. However, the amount of surveillance data captured in the form of video or images is typically huge, due to vastness of infrastructures. Since so much data cannot be stored, it needs to be transmitted to a storage device on-ground. For continuous transmission, a path is desired along which maximal wireless signal coverage is available. Design of such path gets complex due to the fact that in vast surveillance areas, there may be sub-areas which are no-coverage zones. The no-coverage regions arise because of absence of a base station in the vicinity. Conventional methods of aerial path planning address generic conditions like shortest path. The applicant has addressed a challenge of averting possibility of an aerodynamic stall during motion of a fixed wing vehicle by considering a turn angle constraint in a previous patent application no. 201721001481 filed on 13 Jan. 2017 at the Indian Patent Office. The applicant has also addressed the challenge of maintaining transmission continuity by planning aerial paths in presence of coverage holes in a previous patent application no. 201721008458 filed on 10 Mar. 2017 at the Indian Patent Office, wherein apart from a plurality of inter-related constraints, storage constraint was taken into account to avert overflow of a storage device and ensure continuity of transmission. However, addressing transmission continuity may not necessarily provide a cost efficient path for the aerial vehicle.

SUMMARY

Embodiments of the present disclosure present technological improvements as solutions to one or more of the above-mentioned technical problems recognized by the inventors in conventional systems.

In an aspect, there is provided a processor implemented method comprising: discretizing a 3-Dimensional (3D) Euclidean navigation space of an aerial vehicle for tractability by imposing a grid of a plurality of unit cells, on the 3D Euclidean navigation space; pruning the 3D Euclidean navigation space by identifying a flight corridor therein based on a minimum separation constraint being a pre-defined minimum distance from a target under consideration and a maximum separation constraint being a pre-defined maximum distance from the target under consideration; and identifying a set of optimal paths from a source node to a destination node within the flight corridor based on a depth-first search traversal of the flight corridor, the set of optimal paths being a Pareto set simultaneously satisfying multiple objectives and one or more pruning constraints.

In another aspect, there is provided a system comprising: one or more data storage devices operatively coupled to the one or more processors and configured to store instructions configured for execution by the one or more processors to: discretize a 3-Dimensional (3D) Euclidean navigation space of an aerial vehicle for tractability by imposing a grid of a plurality of unit cells, on the 3D Euclidean navigation space; prune the 3D Euclidean navigation space by identifying a flight corridor therein based on a minimum separation constraint being a pre-defined minimum distance from a target under consideration and a maximum separation constraint being a pre-defined maximum distance from the target under consideration; and identify a set of optimal paths from a source node to a destination node within the flight corridor based on a depth-first search traversal of the flight corridor, the set of optimal paths being a Pareto set simultaneously satisfying multiple objectives and one or more pruning constraints.

In yet another aspect, there is provided a computer program product comprising a non-transitory computer readable medium having a computer readable program embodied therein, wherein the computer readable program, when executed on a computing device, causes the computing device to: discretize a 3-Dimensional (3D) Euclidean navigation space of an aerial vehicle for tractability by imposing a grid of a plurality of unit cells, on the 3D Euclidean navigation space; prune the 3D Euclidean navigation space by identifying a flight corridor therein based on a minimum separation constraint being a pre-defined minimum distance from a target under consideration and a maximum separation constraint being a pre-defined maximum distance from the target under consideration; and identify a set of optimal paths from a source node to a destination node within the flight corridor based on a depth-first search traversal of the flight corridor, the set of optimal paths being a Pareto set simultaneously satisfying multiple objectives and one or more pruning constraints.

In an embodiment of the present disclosure, the one or more hardware processors are further configured to identify the set of optimal paths from a source node to a destination node by: identifying a set of feasible paths from the source node to the destination node within the flight corridor; pruning the set of feasible paths to identify the set of optimal paths by: identifying a current node, a grandparent node and a parent node associated with the current node for each of the feasible paths; evaluating one or more neighbor nodes for the current node associated with each of the feasible paths to identify the one or more neighbor nodes satisfying the multiple objectives and the one or more pruning constraints; augmenting one or more partial paths to the one or more neighbor nodes, the one or more partial paths being associated with the one or more feasible paths and satisfying the multiple objectives and the one or more pruning constraints, else dropping the one or more partial paths; and backtracking to at least one prior node along the augmented one or more partial paths each time the destination node is reached by the one or more partial paths, to add, to the Pareto set, the one or more partial paths that have reached the destination node by satisfying the multiple objectives and the one or more pruning constraints.

In an embodiment of the present disclosure, the multiple objectives comprise simultaneously optimizing distance cost and communication cost associated with the one or more feasible paths.

In an embodiment of the present disclosure, the one or more hardware processors are further configured to model the communication cost as a monotonic function of instantaneous Signal-to-Noise Ratio (SNR) measurement at each node along the one or more feasible paths.

In an embodiment of the present disclosure, the one or more pruning constraints comprise: pruning by eliminating cycles from a graph model of the 3D Euclidean navigation space; pruning partial paths based on a Nadir point being a cost vector in an objective space associated with solutions to two mono-objective problems that establish an upper bound for a bi-objective solution for simultaneously optimizing distance cost and communication cost; pruning dominated partial paths based on online efficient set of solutions; pruning based on node labels being cost vectors associated with each node; pruning partial paths not satisfying a minimum route leg length constraint between the parent node and the current node, the minimum route leg length constraint being a pre-defined minimum distance wherein the augmented partial path from the current node to the one or more neighbor nodes is a straight segment; and pruning partial paths not satisfying a maximum turn angle constraint consistency for the one or more neighbor nodes with respect to the grandparent node and further with respect to the parent node in the event that the evaluation with respect to the grandparent node fails, the maximum turn angle constraint being a maximum turning angle permissible for the aerial vehicle.

It is to be understood that both the foregoing general description and the following detailed description are exemplary and explanatory only and are not restrictive of the embodiments of the present disclosure, as claimed.

BRIEF DESCRIPTION OF THE DRAWINGS

The embodiments herein will be better understood from the following detailed description with reference to the drawings, in which.

Figure 1:
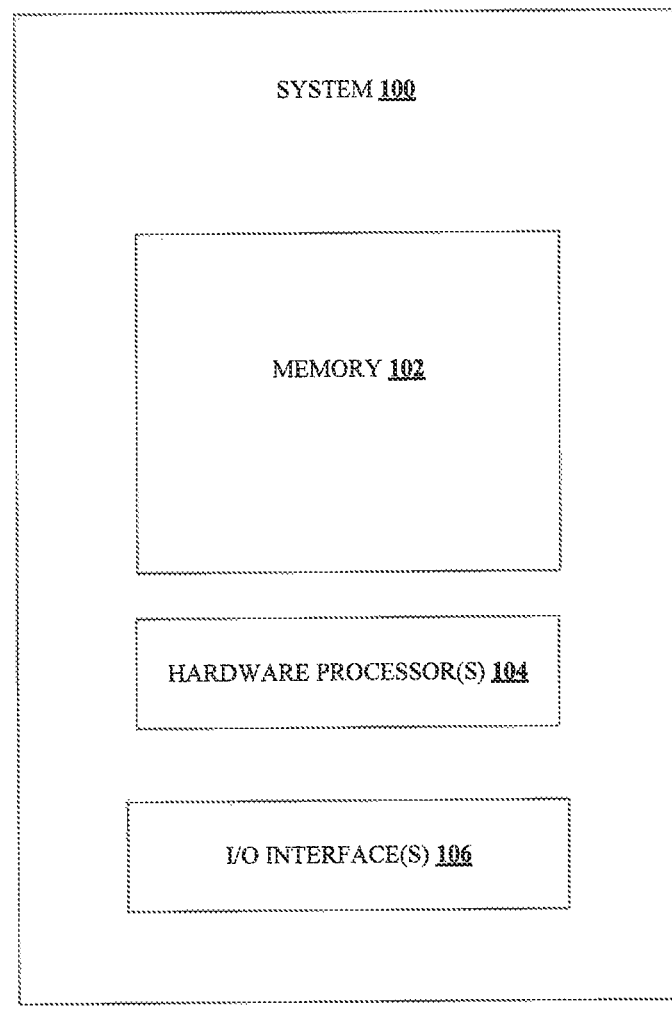
FIG. 1 illustrates an exemplary block diagram of a system for distance and communication costs based aerial path planning, in accordance with an embodiment of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Some embodiments of this disclosure, illustrating all its features, will now be discussed in detail. The disclosed embodiments are merely exemplary of the disclosure, which may be embodied in various forms.

Before setting forth the detailed explanation, it is noted that all of the discussion below, regardless of the particular implementation being described, is exemplary in nature, rather than limiting.

In the context of the present disclosure, the expression "aerial vehicle" may refer to a fixed-wing vehicle such as unmanned aerial vehicles (UAVs) or drones, gliders, airplanes, and the like.

Fixed-wing vehicles are required to make a turning maneuver less than or equal to a predetermined maximum turning angle. Planning an aerial path in the presence of coverage holes or obstacles keeping in mind the turn angle constraint was addressed by the applicant in a previous patent application no. 201721001481 filed on 13 Jan. 2017 at the Indian Patent Office. The applicant has further addressed the challenge of maintaining transmission continuity in the presence of coverage holes by imposing a plurality of constraints and minimizing storage of surveillance data onboard in a previous patent application no. 201721008458 filed on 10 Mar. 2017. Parts of the aforementioned applications are re-produced herein by way of explanation. The present disclosure provides path planning systems and methods for aerial vehicles particularly taking into consideration distance cost and communication cost involved therein. Accordingly, the present disclosure provides systems and methods that identify a set of optimal paths to a destination node by pruning feasible aerial paths based on simultaneously satisfying multiple objectives, and one or more pruning constraints and generating a set of optimal paths for surveillance of a target under consideration.

Referring now to the drawings, and more particularly to FIGS. 1 through 4, where similar reference characters denote corresponding features consistently throughout the figures, there are shown preferred embodiments and these embodiments are described in the context of the following exemplary system and method.

FIG. 1 illustrates an exemplary block diagram of a system 100 for distance and communication costs based aerial path planning, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
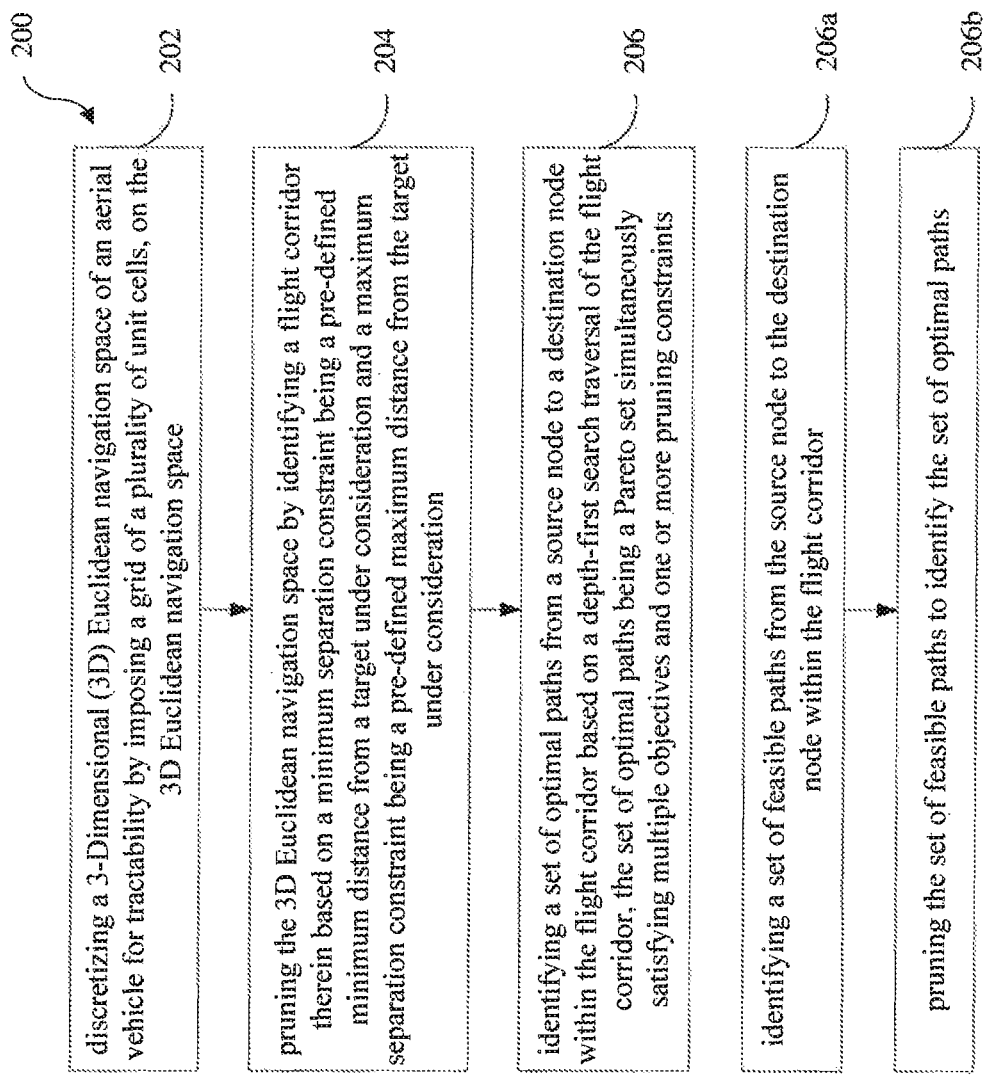
FIG. 2 is an exemplary flow diagram illustrating a computer implemented method for distance and communication costs based aerial path planning, in accordance with an embodiment of the present disclosure.

FIG. 2 is an exemplary flow diagram illustrating a computer implemented method 200 for distance and communication costs based aerial path planning, in accordance with an embodiment of the present disclosure. In an embodiment, the system 100 comprises one or more data storage devices or memory 102 operatively coupled to the one or more processors 104 and is configured to store instructions configured for execution of steps of the method 200 by the one or more processors 104.

Formal specification of any optimization problem entails specification of decision variables, the cost or objective as a function of the decision variables, and constraints wherever applicable. In terms of the decision variables, there is only one set involved, the 3D instantaneous location of the UAV: <x,y,z>. If the altitude is assumed constant, then the location is a 2-tuple, formed by latitude and longitude. In terms of constraints, the present disclosure focusses on a plurality of constraints, viz., minimum and maximum separation constraints, minimum route leg length constraint and turn angle constraint. In the context of the present disclosure, particularly bi-objectives addressed include distance cost and communication cost.

Linear infrastructures generally require that no man, machine or any other artificial system ever intrude within a pre-defined vicinity of the infrastructure. Such restricted area is called Right of Way. In case of unmanned flights, flying too close to the infrastructure and sudden control failure of the aerial vehicle such as UAV may also mean that the aerial vehicle or a part of it may fall on the infrastructure and damage it, which may lead to interruption of critical supply that the particular infrastructure bears. Further, specifically in the case of power grid corridors, flying too close to HV transmission lines may lead to electromagnetic interference between the electrical circuits of the aerial vehicle, and power lines. Such interference may lead to corruption of internal flight control data over internal wires, and eventual failure of pilot flights. The minimum separation constraint, in the context of the present disclosure, refers to a pre-defined minimum distance from a target under consideration.

A visual capturing device such as a camera mounted in the belly of the aerial vehicle may be used to perform a remote surveillance task involving capturing images of long linear infrastructures. A visible range digital camera, using any technology has a performance limit, fundamentally due to its usage of lens system, and a finite-sized charge-coupled device (CCD) or complementary metal-oxide semiconductor (CMOS) backplane. It is understood that if the distance between the object being imaged, and a digital visible-range camera is more than a specific distance known as Depth of Field, then the object cannot be properly imaged or will be as hazy as underlying background, typically earth's surface or terrestrial terrain. The application demands that the foreground object of interest be reasonably sharp and distinct from background, for computer vision techniques to be applied for segmenting out thinner infrastructures against the vast and wide background. The maximum separation constraint, in the context of the present disclosure, refers to a pre-defined maximum distance from the target under consideration.

In the context of the present disclosure, a minimum route leg length constraint forces the path taken by the aerial vehicle to be a straight segment for a pre-defined minimum distance before initiating a turn. The pre-defined minimum distance may be based on inertia of motion, such that the aerial vehicle moves along a straight path for the pre-defined minimum distance based on inertia before making a turn.

In the context of the present disclosure, a turn angle constraint forces a generated path to make a turning maneuver, less than or equal to a maximum turning angle permissible for the aerial vehicle. This constraint avoids possibility of an aerodynamic stall during motion of a fixed wing vehicle.

Distance cost is a mandatory cost component in all path planning algorithms that have arisen till date. It represents the length, in Euclidean space, of an optimal path undertaken by the aerial vehicle. This cost directly correlates to the limited battery power of the aerial vehicle, which is not fuel-driven. At a certain speed of the aerial vehicle, against an assumed constant wind speed, the energy of a charged battery may last only a certain distance. To try to maximize the mission, given that application required tens of kilometers to be remotely surveyed, the distance cost has to be minimized. In a discrete graph model of the navigation space, this reduces to finding the shortest path in Euclidean space (Euclidean shortest path).

For any path in discrete grid, piecewise-linear path assumption is a valid assumption also because of the shortest length, Lmin constraint. In such a case, insertion of additional variables to denote turning points of the aerial vehicle and sum of Euclidean distances between such successive turning points, is a direct measure of such cost. Let $P_{T_i}$; i∈1, ..., T be the coordinate tuple of each turning point along a path in a coordinate system such as say, world coordinate system (WCS).

$$\text{Path cost} = \sum_{i=1}^{T-1} \|P_{T_{i+1}} - P_{T_i}\|$$

wherein $\|\cdot\|$ denotes an appropriate norm, typically being L2 (Least squares) norm.

In the context of the present disclosure, communication cost may be represented as node weights that capture probability that packets delivered given a Signal-to-Noise Ratio (SNR) at a transmission node location are correctly decoded by their intended receivers. It may be modeled as a conditional probability, with the given condition being a sequence of sensing events. The communication cost is intuitively related to, and fundamentally reflects in the energy spent by the on-board transmitter in transmitting various frames, against varying wireless signal coverage conditions. It may be noted that if a received signal strength at an access point (AP) or base station is lesser than a threshold, then it cannot be recovered. Hence, in an inverse way, to have constant quality of signal reception in the form of Bit Error Rate/Packet Error Rate (BER/PER), one needs to increase transmission power on-board. This in turn leads to excess dissipation of battery energy.

Since channel conditions generally vary, an instantaneous transmitted power pTx is related to instantaneous SNR as sampled at the current location of an aerial vehicle. However, for any optimization problem, global cost needs to be measured, rather than local costs. The instantaneous SNR is dependent on the distance between current position of the aerial vehicle, and the receiver at the closest AP. Hence, a global version of this cost component, in accordance with the present disclosure, is based on line integral of a function of minimum SNR, sensed at a current location along a final path. If the transmitter and receiver cooperates and has a dynamic bandwidth allocation policy, then the degree of fullness of transmitter-end queue size also affects the instantaneous communication condition, not just the SNR. However, in accordance with the present disclosure, infinite-length queue size is assumed and effect of fullness of transmitter-end queue size is ignored.

The domain of Multi-objective Optimization (MOO), or Pareto Optimization deals with having more than one cost function to be optimized simultaneously. For such problems, optimal decisions need to be taken in the presence of tradeoffs between two or more conflicting objectives. This is because when multiple objectives are addressed simultaneously, it is not possible to guarantee an existence of a solution that simultaneously minimizes (optimizes) all the scalar cost functions. Hence, alternatively, solution(s) which have an acceptable amount of tradeoff among the cost values are sought. Due to existence of tradeoff, typically there is no single solution to a MOO problem, but a set of optimal configurations forming a so-called Pareto set or Pareto front. The size of Pareto optimal set is a lot of times shown to be non-polynomial in the problem size, if not exponential. Hence most of the MOO problems are Non-deterministic Polynomial (NP) hard problems. An exception sometimes happens when the objective function is linearized, and further if the space of decision variables is continuous, then the solution set of supported solutions can be found in polynomial time.

The multi-objective shortest path problem (MSPP) is an extension of the traditional shortest path problem addressed by the applicant in earlier patent applications referred herein above and is concerned with finding a set of cost efficient paths in a graph model of the 3D Euclidean navigation space, with respect to two or more objectives that are usually in conflict. For example, the problem of finding optimal paths in communications networks traditionally involves minimizing delay while maximizing throughput. Another example in transportation networks involves finding efficient routes that minimize travel cost, path length, and travel time simultaneously. The types of costs that are used in practical MSPP problems vary. Du-Hyun Han, Yeong-Dae Kim, and Ju-Yong Lee account for three costs in their article entitled "Multiple-criterion shortest path algorithms global path planning of unmanned combat vehicles", which includes perception of risk environment during the movement of the agent along some path in the graph. However, a general MSPP problem is solved conventionally by obtaining only supported efficient solutions. The work in "Communication-Aware Motion Planning for Mobile Robots" by Magnus Lindhe accounts for communication and distance cost in case of ground robots. It is understood by a person skilled in the art that for the practical 3D Euclidean space in which all such constrained problems exist, the problem is NP-hard in nature, even in a continuous domain.

To reduce computational complexity, in an embodiment, the one or more processors 104 are configured to discretize, at step 202, a 3-Dimensional (3D) Euclidean navigation space of an aerial vehicle for tractability. A grid of a plurality of unit cells is imposed on the 3D Euclidean navigation space, wherein the grid may be either a patterned grid or an irregular grid. In a discrete 3D Euclidean navigation space with obstacles, it is known that the underlying set of grid points is not convex. Also, for spaces of dimension 3 and above, the path optimization problem is NP (Non-deterministic Polynomial) hard. Hence algorithms, typically inspired by shortest path algorithms in a convex domain, e.g. Dijkstra, have been researched for design for approximately optimal solutions/paths. The Theta* algorithm, which is a basic approximation algorithm improves upon the approximation error while using A*, by trading off minimally with computational complexity. Hence Theta* algorithm has been used in the present disclosure. It is also known that up to a certain size of a graph model of the 3D Euclidean navigation space, meeting multi-objective shortest path solutions take reasonable amount of computational time, if solved in an exact manner.

In accordance with the present disclosure, first a feasible space within the 3D (or 2D) Euclidean space is identified. The plurality of constraints described herein above are then applied to identify a subspace of the 3D (or 2D) Euclidean space in which the path maybe physically present as a union of navigable regions. More precisely, since the Euclidean space is discretized into a grid-based graph, some of the constraints may lead to a bigger feasible set that is a forest. For the remaining constraints, a greedy search is performed within the forest for optimal paths while simultaneously obeying the remaining constraints during greedy path formation via stepwise path augmentation.

Figure 3:
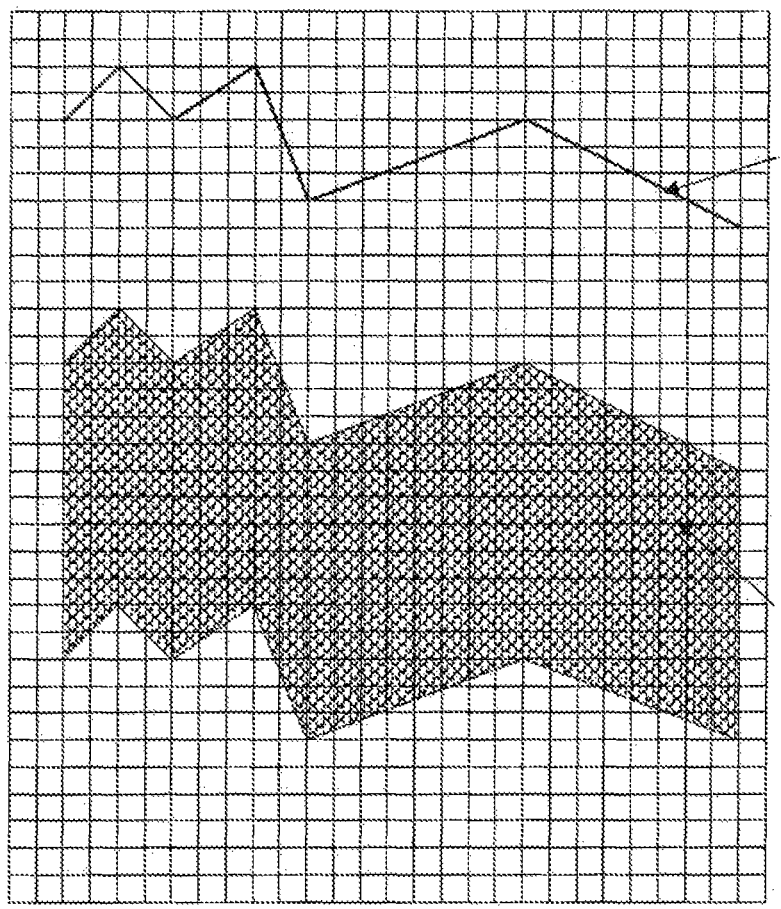
FIG. 3 illustrates a flight corridor identified in 3-Dimensional (3D) Euclidean navigation space of an aerial vehicle based on a minimum separation constraint and a maximum separation constraint in accordance with the present disclosure.

In accordance with the present disclosure, the minimum separation constraint and the maximum separation constraint are two constraints that lead to direct pruning of the Euclidean space. In an embodiment, the one or more processors 104 are configured to prune the 3D navigation space, at step 204, by identifying a flight corridor therein defined between the minimum separation constraint and the maximum separation constraint. FIG. 3 illustrates a flight corridor identified in 3-Dimensional (3D) Euclidean navigation space of an aerial vehicle based on a minimum separation constraint and a maximum separation constraint in accordance with the present disclosure. The target under consideration for surveillance is a transmission line modeled as shown in FIG. 3. It may be noted that imposition of the minimum separation constraint leads to creation of a half space on either side of the infrastructure (the transmission line modeled as the target under consideration for surveillance). Each of the half space may extend till infinity but does not intersect the infrastructure itself. Similarly, the imposition of the maximum separation constraint leads to creation of another half space on either side of the infrastructure. This half space not only extends in the opposite direction of the half space arising from the minimum separation constraint, but also intersects the infrastructure and does not extend till infinity. The method 200 of the present disclosure necessitates that the minimum separation constraint and the maximum separation constraint be obeyed simultaneously, thereby identifying the flight corridor generated by intersection of the two half spaces described herein above. In a 2D scenario, the flight corridor lies on either side of the target under consideration which in a 3D scenario, the flight corridor is a cylindrical annulus around the target under consideration.

In accordance with the present disclosure, the one or more processors 104 are configured to identify, at step 206, a set of optimal paths from a source node to a destination node within the flight corridor based on a depth-first search traversal of the flight corridor, the set of optimal paths being a Pareto set simultaneously satisfying multiple objectives and one or more pruning constraints.

The step 206 of identifying a set of optimal paths from the source node to the destination node firstly comprises identifying, at step 206a, a set of feasible paths from the source node to the destination node within the flight corridor. The present disclosure attempts to perform fast pruning of inefficient solutions or the feasible paths in the solution space or the identified flight corridor based on Pulse algorithm that may lead to faster convergence to the Pareto set. In accordance with the present disclosure, the pulse algorithm may be explained with reference to certain expressions provided herein below.

Bi-objective shortest path problem (BSP): Consider a directed graph G=(N,A) where N={$v_1, \ldots, v_i, \ldots, v_n$} is a set of nodes and A={(i,j)|$v_i \in N, v_j \in N$} is a set of arcs. For all arcs (i,j)∈A, let there be two non-negative weights or costs of traversing an arc, denoted by $c_{ij}$ and $t_{ij}$. A Bi-objective Shortest Path Problem (BSP) is the problem of finding paths P from A start node $v_s \in N$ to an end node $v_e \in N$ that minimize two different (often conflicting) objective functions. The BSP can be formally defined as follows:
minimize z(x)=(c(x),t(x)) such that x∈X
where x is a path P represented by a vector of (binary) arc flows $x_{ij}$,(i,j)∈A; c(x)=$\Sigma_{(i,j) \in A} c_{ij} \cdot x_{ij}$ is a first cost component of path x; t(x)=$\Sigma_{(i,j) \in A} t_{ij} \cdot x_{ij}$ is a second cost component of path x; and X is the set of all paths from $v_s$ to $v_e$, which satisfy path planning constraints, if any.

Efficient or Cost Efficient solution: An image of any solution x∈X on a cost or objective space Z is a vector denoted by the cost z(x)=(c(x),t(x))∈Z, where c(x) and t(x) are the values of each cost component function. In the BSP, a set of solutions that cannot improve one component of the objective vector z(x) without deteriorating the other one is obtained. A solution x∈X is efficient if there does not exist another solution x'∈X such that c(x')<c(x) and t(x')<t(x) or c(x')≤c(x) and t(x')<t(x). A set of efficient solutions is known as an Efficient Set.

Online Efficient Set: Various (current) nodes of each partial path that is getting augmented as part of the Pareto front, evolve in different directions and hence converge to a goal node in different iterations. Given an algorithm, the set of efficient solutions discovered so far at any given iteration is called the online efficient set and it is denoted as $\mathcal{X}_E$.

Dominated Solution: Any given solution has a corresponding vector (point) in the cost or objective space Z that can be either dominated or non-dominated. The image z(x) of an efficient solution x is said to be a non-dominated vector. If the solution is not efficient, then its image is a dominated vector in the objective space. The set of all non-dominated vectors is denoted by $Z_N$. More formally, let x,x'∈X be two solutions representing feasible paths. If c(x')<c(x) and t(x')≤t(x) or c(x')≤c(x) and t(x')<t(x), then z(x) is said to be dominated by z(x'), and it is denoted by z(x')≼z(x).

The pulse algorithm is based on depth-first search (DFS) traversal of a given graph. Given the graph model of the 3D Euclidean navigation space that was first pruned to identify the flight corridor in which a path from a start node to an end node has to be found out, the algorithm sends an "analogical" pulse from the start node. This pulse travels through the entire graph, while storing the cost vector and the partial path sequence along the traversal. There may be multiple paths to the end node, and hence multiple pulses may reach the end node. Each pulse that reaches the end node may not be the most cost-wise efficient pulse. To discover more efficient pulse in a depth-first way, any pulse that has reached the end node is made to backtrack to continue its propagation through the rest of the nodes in the search for more efficient paths. The backtracking naturally occurs, when DFS is used to propagate the Pareto front throughout in the solution space. When traversal is free of constraints, then the algorithm expectedly completely enumerates the search space, and hence guarantees that the efficient (Pareto) set is always found. The Pulse algorithm is practically fast and useful since it stops the exploration along any partial path, whenever extending the partial path does not lead to an efficient solution. This is a type of forward-looking, which aggressively prunes vast regions of the solution space, thus accelerating the solution space exploration by a branch and bound approach.

To implement pruning, and hence to control pulse propagation, the one or more pruning constraints that prune pulses without cutting off any efficient solution is employed. The one or more pruning constraints are used every time a pulse arrives at a (neighbor) node, to check for inefficiency and subsequent dropping/non-propagation of an augmented partial path. It is imperative that such forward-looking strategy of pruning a partial path does not discard just one solution, but all the solutions that contain the partial path. Hence the Pulse algorithm of the present disclosure transforms an explicit enumeration approach into an efficient implicit enumeration approach. In spirit, the Pulse algorithm follows the intuition behind implicitly enumerated branch-and-bound solutions.

Figure 4:
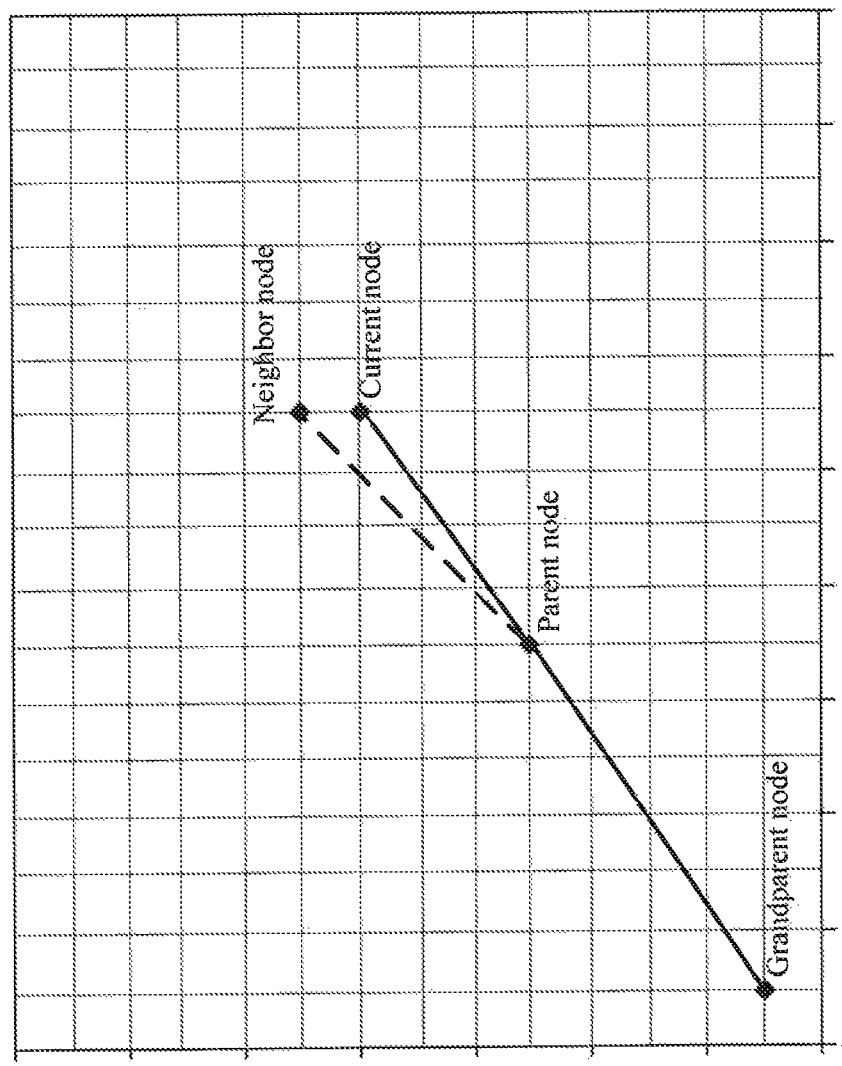
FIG. 4 illustrates node nomenclature for a shortest path algorithm, in accordance with an embodiment of the present disclosure.

Accordingly, in accordance with the method 200 of the present disclosure, at step 206b, the set of feasible paths are pruned to identify the set of optimal paths by firstly identifying a current node, a grandparent node and a parent node associated with the current node for each of the feasible paths. FIG. 4 illustrates node nomenclature for a shortest path algorithm, in accordance with an embodiment of the present disclosure. One or more neighbor nodes for the current node associated with each of the feasible paths are evaluated to identify the one or more neighbor nodes satisfying the multiple objectives and the one or more pruning constraints. The one or more partial paths that satisfy the multiple objectives and the one or more pruning constraints are augmented; else the one or more partial paths are dropped. Each time the destination node is reached by the one or more partial paths, the pulse backtracks to at least one prior node along the augmented one or more partial paths, as in the standard depth-first search exploration, to add, to the Pareto set, the one or more partial paths that have reached the destination node by satisfying the multiple objectives and the one or more pruning constraints. In an embodiment the one or more pruning constraints are described as given herein below.

Pruning by eliminating cycles from a graph model of the 3D Euclidean navigation space: Since all weights on the arcs are non-negative, any efficient solution cannot contain cycles. This is because cost is dominated by the cost of the simple sub-path thereof, in which all the nodes forming the cycle, barring the node which is twice counted, are removed (twice-counted nodes are removed once). To avoid cycles in a path, every time the pulse function is invoked at a node $v_i$, the algorithm checks a function that indicates whether a node has been visited or not. If node $v_i$ lies already on the partial path, path P is pruned by cycles.

Pruning partial paths associated with possible mono-objective solutions from the Pareto set based on a Nadir point: Let the solutions of two mono-objective shortest path problems, $x_c^*$ and $x_t^*$, involving cost components c and t respectively, lead to cost vectors of $<\underline{C}, \overline{T}>$ and $<\overline{C}, \underline{T}>$ respectively. Then, any solution x with $c(x) > \overline{C}$ or $t(x) > \overline{T}$ is a dominated solution, at least by either $x_c^*$ or $x_t^*$. A Nadir point, denoted by $Z^N = (\overline{C}, \overline{T})$, is a vector in the cost or objective space associated with solutions to two mono-objective problems that establish an upper bound for any bi-objective solution; for instance simultaneously optimizing distance cost and communication cost. Under alternative optimal solutions for the mono-objective shortest path problem, $\overline{C}$ and $\overline{T}$ are the smallest values among all alternative solutions of $x_c^*$ and $x_t^*$, respectively. Based on this observation, all partial paths which exhibit such partial costs may be pruned out from the Pareto front.

Pruning dominated partial paths based on online efficient set of solutions: After initialization, the online efficient set has two elements, $x_c^*$ and $x_t^*$, having cost vectors $<\underline{C}, \overline{T}>$ and $<\overline{C}, \underline{T}>$. Hence the efficient solution region initially spans a square region from $<\underline{C}, \overline{T}>$ to $<\overline{C}, \underline{T}>$. As the pulses (partial paths) progress and newer solutions become part of the online efficient set, the shape of the square region shrinks and changes. At any iteration, a new solution is labeled efficient if its image is in the (latest) non-dominated region. Each partial path is extended using optimistic bounds to get a safe/best estimate of final cost (adding cost vector till the current node with a predicted value of remaining cost vector till the destination node). If the estimate falls outside of the non-dominated region, then such partial path can be pruned out.

Pruning based on node labels being cost vectors associated with each node: In case of multi-objective optimization, the paths corresponding to various solutions in the Pareto set are not node-disjoint i.e. two partial paths initially evolve in different directions but at some stage may cross each other at a common node. Hence algorithms directed at multi-objective optimization, whether exact or not, employ a strategy of storage of multiple cost vectors ("labels") at each node, for all of the evolving and crossing partial paths. Correspondingly, for any incoming pulse at any node, if the corresponding label is dominated by any existing label on that node, the pulse may be discarded by label pruning.

Pruning partial paths not satisfying a minimum route leg length constraint between the parent node and the current node (explained in detail in the applicants' earlier patent application): If any specific evolving pulse is noticed to be turning too early i.e. disobeying the minimum length constraint, then that pulse may be pruned out. It may be noted that due to presence of multiple labels, even if a pulse gets pruned at a node, the node may be part of a feasible and efficient (non-dominated) pulse in some iteration.

Pruning partial paths not satisfying a maximum turn angle constraint consistency for the one or more neighbor nodes (explained in detail in the applicants' earlier patent application) with respect to the grandparent node and further with respect to the parent node in the event that the evaluation with respect to the grandparent node fails: If a partial path is to be extended from a current node via a neighbor node, and the maximum turn angle constraint is not satisfied, then that partial path is dropped. Another path or pulse may then be picked up based on backtracking. In a mono-objective case, a new pulse is picked up immediately, in next few iterations, by explicitly doing backtracking. In the bi-objective case, as in the present disclosure, a pulse will eventually be picked up naturally during the DFS search, since the pulse algorithm traverses entire solution space. The DFS-type backtracking only happens once a pulse reaches the destination node, to look out for alternative paths in the search space.

In an embodiment, the multiple objectives addressed comprise simultaneously optimizing distance cost and communication associated with the one or more feasible paths. In an embodiment, the communication cost is modeled as a monotonic function of instantaneous Signal-to-Noise Ratio (SNR) measurement at each node along the one or more feasible paths. The SNR measurement is done at a specific location in the 3D Euclidean navigation space. This in turn, in a discretized setup, leads to the costs being in form of node weights. The method 200 described herein deals with edge weights, since the method is a kind of evolution of Dijkstra's classical edge-weighted shortest path finding algorithm. However, node weights may be recast into edge weights based on a convention that an outgoing edge from a node is labeled with the weight of the node from which it originated. In case of undirected graphs, each undirected edge may be split into two directed edges. Further, Dijakstra's algorithm and all its variants directly work without modification to directed graphs as well.

It has been shown experimentally that as simple a device as a smartphone may perform satisfactory communication when the channel Received Signal Strength Indicator (RSSI) level is down up to around −60 dBm. Hence practical communication cost as node weight may be negative. Using the convention, it implies that the corresponding directed edge weights may be negative. It is known that shortest path algorithms work as long as there is no cycle having negative weight. Since channel conditions are not expected to vary drastically in the vicinity of any node in non-urban conditions, it is not possible to guarantee that even for a 3-edge cycle, the cumulative weight may not be negative. In fact, all three edges may be based on negative RSSI levels. Therefore, in accordance with the present disclosure, a monotonic function is used on the RSSI measurements in dBm to make them into exponential values: $e^{RSSIval}$. Such conversion via a monotonic function changes the node weights into positive values. In such a case, it is imperative that there may be only non-negative weight cycles in the graph. The method 200 of the present disclosure then proceeds with the fast branch-and-bound pruning algorithm explained herein above to find out the Pareto set.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A processor implemented method (200) comprising:
    discretizing, a 3-Dimensional (3D) Euclidean navigation space of an aerial vehicle for tractability by imposing a grid of a plurality of unit cells, on the 3D Euclidean navigation space (202);
    pruning, the 3D Euclidean navigation space by identifying a flight corridor therein based on a minimum separation constraint being a pre-defined minimum distance from a target under consideration and a maximum separation constraint being a pre-defined maximum distance from the target under consideration (204); and
    identifying, a set of optimal paths from a source node to a destination node within the flight corridor based on a depth-first search traversal of the flight corridor, the set of optimal paths being a Pareto set simultaneously satisfying multiple objectives and one or more pruning constraints (206).

2. The processor implemented method of claim 1, wherein identifying the set of optimal paths from a source node to a destination node comprises:
    identifying a set of feasible paths from the source node to the destination node within the flight corridor (206*a*);
    pruning the set of feasible paths to identify the set of optimal paths (206*b*) by:
        identifying a current node, a grandparent node and a parent node associated with the current node for each of the feasible paths;
        evaluating one or more neighbor nodes for the current node associated with each of the feasible paths to identify the one or more neighbor nodes satisfying the multiple objectives and the one or more pruning constraints;
        augmenting one or more partial paths to the one or more neighbor nodes, the one or more partial paths being associated with the one or more feasible paths and satisfying the multiple objectives and the one or more pruning constraints, else dropping the one or more partial paths; and
        backtracking to at least one prior node along the augmented one or more partial paths each time the destination node is reached by the one or more partial paths, to add, to the Pareto set, the one or more partial paths that have reached the destination node by satisfying the multiple objectives and the one or more pruning constraints.

3. The processor implemented method of claim 1, wherein the multiple objectives comprise simultaneously optimizing distance cost and communication cost associated with the one or more feasible paths.

4. The processor implemented method of claim 3, wherein the communication cost is modeled as a monotonic function of instantaneous Signal-to-Noise Ratio (SNR) measurement at each node along the one or more feasible paths.

5. The processor implemented method of claim 4, wherein the one or more pruning constraints comprise:

pruning by eliminating cycles from a graph model of the 3D Euclidean navigation space;

pruning partial paths based on a Nadir point being a cost vector in an objective space associated with solutions to two mono-objective problems that establish an upper bound for a bi-objective solution for simultaneously optimizing distance cost and communication cost;

pruning dominated partial paths based on online efficient set of solutions;

pruning based on node labels being cost vectors associated with each node;

pruning partial paths not satisfying a minimum route leg length constraint between the parent node and the current node, the minimum route leg length constraint being a pre-defined minimum distance wherein the augmented partial path from the current node to the one or more neighbor nodes is a straight segment; and pruning partial paths not satisfying a maximum turn angle constraint consistency for the one or more neighbor nodes with respect to the grandparent node and further with respect to the parent node in the event that the evaluation with respect to the grandparent node fails, the maximum turn angle constraint being a maximum turning angle permissible for the aerial vehicle.

6. A system (100) comprising:

one or more data storage devices (102) operatively coupled to one or more hardware processors (104) and configured to store instructions configured for execution by the one or more hardware processors to:

discretize a 3-Dimensional (3D) Euclidean navigation space of an aerial vehicle for tractability by imposing a grid of a plurality of unit cells, on the 3D Euclidean navigation space;

prune the 3D Euclidean navigation space by identifying a flight corridor therein based on a minimum separation constraint being a pre-defined minimum distance from a target under consideration and a maximum separation constraint being a pre-defined maximum distance from the target under consideration; and identify a set of optimal paths from a source node to a destination node within the flight corridor based on a depth-first search traversal of the flight corridor, the set of optimal paths being a Pareto set simultaneously satisfying multiple objectives and one or more pruning constraints.

7. The system of claim 6, wherein the one or more hardware processors are further configured to identify the set of optimal paths from a source node to a destination node by:

identifying a set of feasible paths from the source node to the destination node within the flight corridor;

pruning the set of feasible paths to identify the set of optimal paths by:

identifying a current node, a grandparent node and a parent node associated with the current node for each of the feasible paths;

evaluating one or more neighbor nodes for the current node associated with each of the feasible paths to identify the one or more neighbor nodes satisfying the multiple objectives and the one or more pruning constraints;

augmenting one or more partial paths to the one or more neighbor nodes, the one or more partial paths being associated with the one or more feasible paths and satisfying the multiple objectives and the one or more pruning constraints, else dropping the one or more partial paths; and backtracking to at least one prior node along the augmented one or more partial paths each time the destination node is reached by the one or more partial paths, to add, to the Pareto set, the one or more partial paths that have reached the destination node by satisfying the multiple objectives and the one or more pruning constraints.

8. The system of claim 6, wherein the multiple objectives comprise simultaneously optimizing distance cost and communication cost associated with the one or more feasible paths.

9. The system of claim 8, wherein the one or more hardware processors are further configured to model the communication cost as a monotonic function of instantaneous Signal-to-Noise Ratio (SNR) measurement at each node along the one or more feasible paths.

10. The system of claim 9, wherein the one or more pruning constraints comprise:

pruning by eliminating cycles from a graph model of the 3D Euclidean navigation space;

pruning partial paths based on a Nadir point being a cost vector in an objective space associated with solutions to two mono-objective problems that establish an upper bound for a bi-objective solution for simultaneously optimizing distance cost and communication cost;

pruning dominated partial paths based on online efficient set of solutions;

pruning based on node labels being cost vectors associated with each node;

pruning partial paths not satisfying a minimum route leg length constraint between the parent node and the current node, the minimum route leg length constraint being a pre-defined minimum distance wherein the augmented partial path from the current node to the one or more neighbor nodes is a straight segment; and pruning partial paths not satisfying a maximum turn angle constraint consistency for the one or more neighbor nodes with respect to the grandparent node and further with respect to the parent node in the event that the evaluation with respect to the grandparent node fails, the maximum turn angle constraint being a maximum turning angle permissible for the aerial vehicle.

11. One or more non-transitory machine readable information storage mediums comprising one or more instructions which when executed by one or more hardware processors causes:

discretizing, a 3-Dimensional (3D) Euclidean navigation space of an aerial vehicle for tractability by imposing a grid of a plurality of unit cells, on the 3D Euclidean navigation space (202);

pruning, the 3D Euclidean navigation space by identifying a flight corridor therein based on a minimum separation constraint being a pre-defined minimum distance from a target under consideration and a maximum separation constraint being a pre-defined maximum distance from the target under consideration (204); and identifying, a set of optimal paths from a source node to a destination node within the flight corridor based on a depth-first search traversal of the flight corridor, the set of optimal paths being a Pareto set simultaneously satisfying multiple objectives and one or more pruning constraints (206).

* * * * *